D. E. PARIS.

RESERVOIR COOKING-STOVE.

No. 6,999. Reissued March 14, 1876.

Witnesses
Edmund Hoole
Amadeus Wilkinson

Assignee
Joseph Baxter Newton
Seg. N.Y.

N. PETERS, PHOTO-LITHOGRAPHER, WASHINGTON, D. C.

UNITED STATES PATENT OFFICE.

DANIEL E. PARIS, OF TROY, NEW YORK, ASSIGNOR, BY MESNE ASSIGNMENTS, TO JOSEPH B. WILKINSON, OF SAME PLACE.

IMPROVEMENT IN RESERVOIR COOKING-STOVES.

Specification forming part of Letters Patent No. 78,819, dated June 9, 1868; reissue No. 6,999, dated March 14, 1876; application filed April 14, 1873.

*To all whom it may concern:*

Be it known that I, DANIEL E. PARIS, of the city of Troy, in the county of Rensselaer and State of New York, invented new and useful Improvements in Stove-Reservoirs, which invention was duly assigned to the firm of BURDETT, PARIS & Co., of the above-mentioned place; and which has been assigned by said BURDETT, PARIS & Co. to BURDETT, POTTER, SMITH & Co., of the above-mentioned place; and by said BURDETT, POTTER, SMITH & Co. assigned to JOSEPH B. WILKINSON, of the above-mentioned place; and I do hereby declare that the following is a full, clear, and accurate description thereof, reference being had to the accompanying drawings, and to letters of reference marked thereon, like letters representing like parts, in which—

Figure 1:
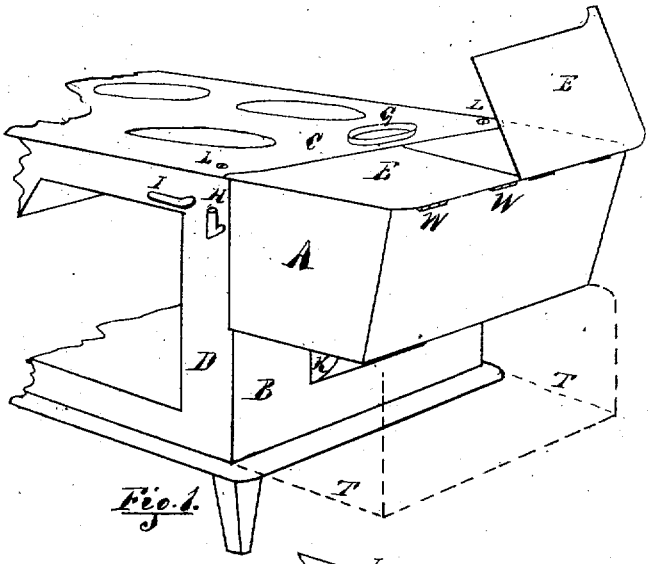
Figure 2:
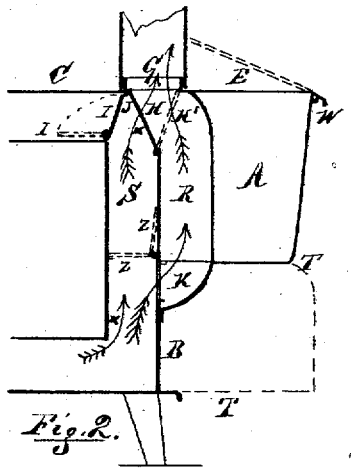
Figure 3:
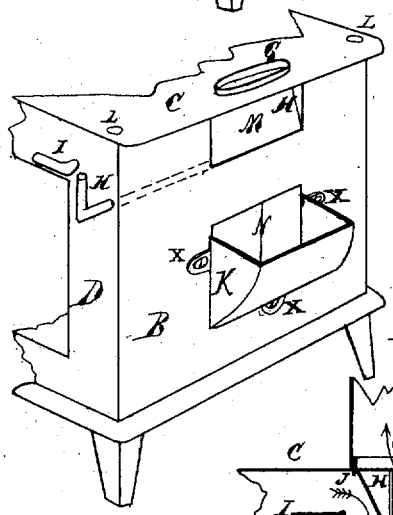
Figure 4:
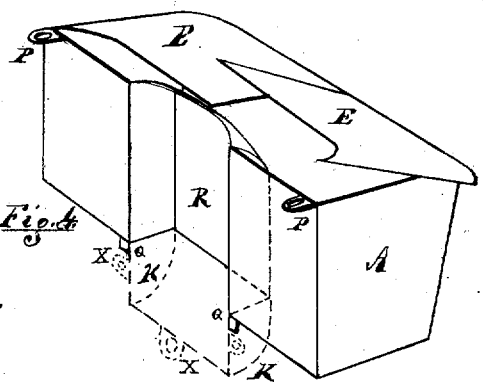
Figure 5:
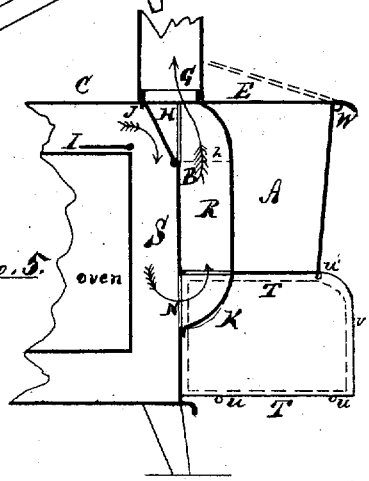

Figure 1 is a perspective view of a cooking-stove with the reservoir attached. Fig. 2 is a sectional view of the same, taken through the center of the stove lengthwise. Figs. 3 and 4 are perspective views of the stove and reservoir separated, showing the back of the stove and the front of the reservoir. Fig. 5 presents the same view as is seen in Fig. 2, except the dampers I and H are placed differently, producing a different effect.

This invention relates to certain improvements in reservoir cooking-stoves; and it consists, first, for the purpose of heating the reservoir only, of a double flue between the oven and the reservoir, arranged to conduct the products of combustion downward in front of the back plate of a cooking-stove and upward in rear of it; second, in a double-acting damper situated below or underneath the pipe-collar of a cooking-stove, having its base at or near the back plate of the stove, while its top part shall move from side to side of said pipe-collar, in combination with the reservoir in rear of and the double flue below said damper; third, in a pipe-collar to a cooking stove situated at one side or end of the stove and over, or nearly over, a double smoke-flue, and in combination therewith, said pipe-collar being placed to receive the currents of heated air from either flue as the damper below is shifted from side to side of said pipe-collar; fourth, in the combination, with a water-reservoir, of two flue-dampers, both situated at one side or end of a cooking stove or range, and arranged to produce or capable of producing the results hereinafter named; fifth, in the combination, with a water-reservoir located in the rear of the rear flues of a diving-flue cooking-stove, having the pipe-collar in front of the reservoir, of a damper or dampers, whereby the gases of combustion, in their passage from the fire-box to the smoke-pipe, are controlled, so that they can be made to pass down in the rear of the oven only, and return to the exit-passage through a flue or auxiliary hot air chamber, thereby heating the rear of the oven and the water-reservoir without passing under the oven; sixth, in a damper or dampers, located in and in combination with the rear upright flue or auxiliary hot-air chamber, for controlling apertures in the division-plate, which, when open, will cause the gases of combustion, in their passage from the fire-box to the smoke-pipe, to pass down in the rear of the oven only, and return upward to exit-passage, thereby heating the rear of the oven and the water-reservoir with a direct draft without passing under the oven; seventh, in the combination, with a water-reservoir located in the rear of the rear flues of a diving-flue cooking-stove having the pipe-collar in front of the reservoir, of a damper or dampers, whereby the currents of heated air or products of combustion are reversed from a downward to an upward motion in the rear vertical flue or flues or auxiliary hot-air chamber, for the purpose of heating the rear of the oven and the inner or front wall of a reservoir by direct draft from the fire-box to the pipe-collar without heating the bottom of the oven.

In Fig. 5 is illustrated a sketch of my hot closet, the construction of which is described in a former application, and it is only slightly modified here to adapt it to its present situation.

The object of this improvement is to simplify my former improvements in back-reservoir stoves. In my former patents I was obliged to have a separate top to my stove in order to attach my reservoir to it. The inside plates had also to be altered, but in this improvement I attach the reservoir to the ordinary plain-top stove, the only difference being the casting of the holes L L through the stove-top, as seen in Figs. 1 and 3. The only change I now make is in the back plate of the stove; in other words, I make my plain stove the same as I make the reservoir-stove, with the exception of the back plate B; and even this I could use by having two loose pieces to close the openings M and N when the stove is used without a reservoir. It costs to mount or put together the plates forming and holding the reservoir made under my previous patents as much as it does to mount or put together all the other plates of the stove; but in this invention it costs nothing at all, except a moment's time spent in putting in the bolts, two of which go through the top plate of the stove at L L, Fig. 3, and through the ears P P, Fig. 4, and three more through the ears X, holding and bolting the piece K to the back B. (Seen in Fig. 3.)

The reservoir is held firmly to the stove at its top part by means of the two bolts through the holes L L, while at the bottom it is held firmly to the stove by means of the lugs Q Q, Fig. 4, fitting with or in the slots O O made at the upper front corners of the piece K. (Seen in Fig. 3.) The upward and outwardly-projecting reservoir-seat K is the same as in my patent of August 13, 1867, except it is smaller, and the flue R, in front of the reservoir and in rear of the back plate of the stove, is combined with the flue-chamber formed by the piece K, the same as in the patent alluded to above, except in this the heat passes directly into the exit-pipe, through the pipe-collar G, without again returning to the rear flue or flues of the stove.

The concave shape of the reservoir, being depressed inwardly at its front side, was shown and described in the reissued patent of J. R. Hyde, July 30, 1867; said depression being made in order to throw the heat more to the center of the water, on the principle that the nearer the heat gets to the center of a body, the quicker it is heated. The cut-off damper H, seen in Figs. 2 and 5, is the same in effect, producing the same result as that shown in my patent of July 30, 1867, although its situation is entirely different. By means of this damper the reservoir can be heated or not, at pleasure; but in the patent of July 30, 1867, as also in the Spaulding patent, the reservoir could not be heated except the oven be heated also. In other words, the heat had to pass around the oven before heating the reservoir, which is a serious drawback in warm weather, for hot water is often wanted for cleaning purposes, and a convenient and quick means of heating it is very desirable. With any other back-reservoir stove it cannot be done without first heating the oven, which not only makes the room very hot, but, by passing entirely around the oven, the heat is so long in reaching the reservoir that the water heats slowly; but by the combination here produced the reservoir can be heated quickly without heating the oven, which is done by turning both the dampers H and I forward, as seen in Fig. 5. The heat then passes down the central back flue of the stove, and thence up in rear of the back of the stove through the flue R, which is formed by depressing the front side of the reservoir inward, as shown in Fig. 4. The heat then takes the direction of the arrows heating the reservoir only on its way to the exit-pipe.

When the damper I is closed, as seen in Fig. 2, the heat then passes around the oven in the usual manner, and then, if the damper H be turned forward, the oven and reservoir both are heated, but if it be turned backward, as shown in dotted lines at H′, then the heat takes the direction of the × arrows, and the oven only is heated. Instead of the damper H, the one shown in dotted lines Z Z, in Fig. 2, may be used, or it may be placed on the other side of the back plate B, in the flue R. But neither of these arrangements would be as desirable, for then the reservoir could not be heated except the oven be heated also, or else the reservoir would have to be heated in order to get direct draft.

My present combination of dampers produces four results never before obtained unitedly, viz: First, by turning the front damper forward, and the back damper backward, I get a direct draft, without heating the oven, or the reservoir either; second, by turning both dampers backward, I heat the oven only; third, by turning both dampers forward, I heat the reservoir only; fourth, by turning the front damper backward, and the back damper forward, I heat both the oven and the reservoir, the latter with the waste heat of the flues. These results have all been secured before by different inventions, that is, all reservoir-stoves produce one or more of these results, but never before have they all been secured in one stove. Thus herein lies the chief value of this improvement, the other advantages being its cheapness in production, trifling expense in mounting, and the reduction in the size of the seat K, thus giving room for a hot closet below, which is made by attaching its upper front corners to the back plate B of the stove, its front wall being formed by said back plate, while its top covering is made by the bottom of the reservoir. I make the closet very nearly the same as described in one of my applications filed March 23, 1868. The end frames T T are held together by one or more bottom cross-bars attached at *u u*. The sheet-metal represented by the black line *v v*, in Fig. 5, forms the bottom and back of the closet, and joins with and is held to the reservoir by another cross-bar, placed at the lower back corner of the reservoir at *u′*. The covers to the reservoir are attached directly to its back top edge, and join with and conform to the back edge or molding of the stove-top C, which latter is notched into a little in order to accommodate the top edge of the reservoir, and so that it will set up and join with the under side of the stove-top.

The lugs P P may, and perhaps had better, be cast on the end of the reservoir, near its front corners, rather than in its front side, as it would probably facilitate molding. The opening N through the back plate of the stove is the same, only smaller, as that shown in my patent of August 15, 1867. Its width corresponds with the width of the central flue of a three-flue stove; its top is on a line with the bottom of the reservoir, and it should project downward sufficiently far that its capacity may correspond with that of the central flue S, and of the reservoir-flue R. The upper opening M (seen in Fig. 3) is not an opening into the stove-flues, for they remain continually closed by the damper H, so that there is no connection at any time between the flues R and the rear flues of the stove; nor can the heat, as it passes through the rear flues of the stove, come in contact with the reservoir, except it pass through the opening N, as in my former patents; nor does the heat, after passing through the chamber N, pass again into the flues of the stove, but directly off into the smoke-pipe, through the collar G.

It will be seen that both the dampers I and H strike against the same stop-piece, (seen at J, Fig. 2,) and that the two dampers turn in opposite directions from this common center. It will also be seen that the pipe-collar G stands almost directly over the back plate B. This is done so as to secure a common opening for the flues. The pipe-collar G may be placed over the flue R, the back-plate B extend upward, and the damper H omitted, but in that case direct draft could only be had by the heat passing downward through the opening N, thus heating the reservoir at all times, a very undesirable result, and which is the greatest fault that is found with the old style of top-reservoir stoves. It will be seen, also, that as the damper H is shifted from one side to the other of the collar G, it operates not only to let the heat in through one of the flues below, but also to shut it off from the other; that is, if the damper H, in Fig. 2, be turned backward at H′, it not only lets the heat through the flue S in the direction of the ×-arrows, but also at the same time shuts it off, and prevents it from passing through the flue R; thus this damper is double acting, producing in this respect the same results as are secured in my patent of July 30, 1867. But instead of one there may be two pipe-collars, one over each of the upright rear flues S and R, and then the damper H would be omitted, for the back B would then extend upward to the top of the stove; but this would be inferior to my present arrangement, for the heat could not then be controlled, unless there should be a damper in one of the exit-pipes above the stove-top before they join together, or else in one of the flues below, but with a damper the arrangement would be substantially the same as that here shown.

I am aware of boilers with smoke-flues passing through them, as the Pratt and Stewart patents, and others, also of flues made for the passage of smoke, &c., at the rear part of the stove, by the front plate of the boiler, as in French ranges and other stoves, and of flue-passages in the boiler-seats, as in the Spaulding patent. These features I do not claim, but only the features and in the manner set forth in the drawings and specifications, and in the following claims. I would add that the damper I in front of the pipe-collar is in common use.

The damper H, on being turned back out of the rear vertical flue, will cause the draft to take the shortest possible escape to the pipe-collar from the fire-box. To bake and not to heat the back of the oven too much, and to secure a reverse draft, an important feature of my invention, I turn the damper H into the rear vertical flue and close the damper I, and force the hot currents down the corner or descending flues, thence under the oven and return to the pipe-collar. To heat the back of the oven and front of the reservoir only without wasting any heat as heretofore, I turn the damper H forward into the vertical flue, as already illustrated in Fig. 5, in which case the aforesaid damper I is open.

I would add, also, that the piece K may extend backward to the back side of the reservoir, if desired, or two-thirds of the way back, and the flue R, made to go up through the center of the reservoir, instead of at its front side; that is, the flue R may be formed by a pipe running through or near the center of the reservoir, and the flue-seat K, used to conduct the smoke or heat to said flue from the rear flue or flues of the stove, in the same way that it now conducts it to the flue R.

Having thus described my improvement, what I claim is—

1. For the purpose of heating the reservoir only, a double flue between the oven and the reservoir, arranged to conduct the products of combustion downward in front of the back plate of a cooking-stove, and upward in rear of it, substantially as described.

2. A double-acting damper situated below or underneath the pipe-collar of a cooking-stove, having its base at or near the back plate of the stove, while its top part shall move from side to side of said pipe-collar, in combination with the reservoir in rear of and the double flue below said damper, substantially as described.

3. A pipe-collar to a cooking-stove, situated at one side or end of the stove, and over, or nearly over, a double smoke-flue, and in combination therewith, said pipe-collar being placed to receive the currents from either flue, as the damper below is shifted from side to side of said pipe-collar, substantially as described.

4. In combination with a water-reservoir, two flue-dampers, both situated at one side or end of a cooking stove or range, and arranged to produce, or capable of producing, the results substantially as described.

5. The combination, with a water reservoir located in the rear of the rear flues of a diving-flue cooking-stove, having the pipe-collar in front of the reservoir, of a damper or dampers, substantially as described, whereby the gases of combustion in their passage from the fire-box to the smoke-pipe are controlled so that they can be made to pass down in the rear of the oven only, and return to the exit-passage through a flue or auxiliary hot-air chamber, thereby heating the rear of the oven and the water-reservoir without passing under the oven.

6. A damper or dampers located in and in combination with the rear upright flue or auxiliary hot-air chamber, for controlling apertures in the division-plate, which, when open, will cause the gases of combustion, in their passage from the fire-box to the smoke-pipe, to pass down in the rear of the oven only, and return upward to exit-passage, thereby heating the rear of the oven and the water-reservoir with a direct draft, without passing under the oven, substantially as described.

7. The combination, with a water-reservoir, located in the rear of the rear flues of a diving-flue cooking-stove, having the pipe-collar in front of the reservoir, of a damper or dampers, substantially as described, whereby the currents of heated air or products of combustion are reversed from a downward to an upward motion, in the rear vertical flue or flues, or auxiliary hot-air chamber, for the purpose of heating the rear of the oven and the inner or front wall of a reservoir by direct draft from the fire-box to the pipe-collar, without heating the bottom of the oven.

JOSEPH B. WILKINSON.

In presence of—

ALMADUS WILKINSON,
RICHARD H. REILLE.